(12) United States Patent
Alexander et al.

(10) Patent No.: US 11,039,180 B2
(45) Date of Patent: Jun. 15, 2021

(54) LINEAR CHANNEL DISTRIBUTION OF CONTENT IN A TELECOMMUNICATIONS NETWORK

(71) Applicant: Level 3 Communications, LLC, Broomfield, CO (US)

(72) Inventors: Jonathan Alexander, Broomfield, CO (US); Ryan T. Korte, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/054,555

(22) Filed: Aug. 3, 2018

(65) Prior Publication Data

US 2019/0045241 A1    Feb. 7, 2019

Related U.S. Application Data

(60) Provisional application No. 62/540,958, filed on Aug. 3, 2017.

(51) Int. Cl.
| | |
|---|---|
| *H04N 21/234* | (2011.01) |
| *H04N 21/218* | (2011.01) |
| *H04N 21/222* | (2011.01) |
| *H04N 21/647* | (2011.01) |
| *H04N 21/235* | (2011.01) |
| *H04L 29/06* | (2006.01) |

(52) U.S. Cl.
CPC ... *H04N 21/23424* (2013.01); *H04L 65/4076* (2013.01); *H04L 65/605* (2013.01); *H04L 65/80* (2013.01); *H04N 21/2181* (2013.01); *H04N 21/222* (2013.01); *H04N 21/2353* (2013.01); *H04N 21/64738* (2013.01)

(58) Field of Classification Search
CPC ............ H04N 21/812; H04N 21/2668; H04N 21/8456; H04N 21/4622; H04N 21/44016; H04N 21/4532; H04N 21/2665
See application file for complete search history.

(56) References Cited

U.S. PATENT DOCUMENTS

| | | | | |
|---|---|---|---|---|
| 10,044,435 | B2 * | 8/2018 | Baudoin | H04B 7/18517 |
| 2003/0066078 | A1 * | 4/2003 | Bjorgan | H04N 5/76 |
| | | | | 725/34 |
| 2003/0212804 | A1 * | 11/2003 | Hashemi | H04N 7/17318 |
| | | | | 709/228 |
| 2004/0168121 | A1 * | 8/2004 | Matz | H04L 63/10 |
| | | | | 715/255 |

(Continued)

*Primary Examiner* — Jason Salce (57) ABSTRACT

Systems and methods for providing multichannel video programming or content through a terrestrial fiber network of a telecommunications network. One or more high-quality content feeds may be provided to one or more replicator devices of the telecommunications network over a communication line. The replicator devices of the network then deliver one or more replicated content streams generated from the content feeds to any number of customers or receivers of the content also connected to the network. The replicators may be configured to, among other things, provide content streams according to a specific schedule, provide alternative content streams for particular customers or in response to particular events, or operate in conjunction with data analyzers for assessing the quality of the content stream or the reliability of the telecommunications network.

19 Claims, 4 Drawing Sheets

(56) References Cited

U.S. PATENT DOCUMENTS

| | | | |
|---|---|---|---|
| 2005/0076099 A1* | 4/2005 | Wang | H04L 29/06027 709/219 |
| 2006/0085553 A1* | 4/2006 | Rachwalski | H03M 7/30 709/233 |
| 2006/0224696 A1* | 10/2006 | King | H04N 21/25891 709/218 |
| 2007/0033608 A1* | 2/2007 | Eigeldinger | H04N 21/47214 725/20 |
| 2007/0079340 A1* | 4/2007 | McEnroe | H04N 21/43615 725/78 |
| 2007/0198839 A1* | 8/2007 | Carle | H04N 21/26291 713/176 |
| 2009/0031383 A1* | 1/2009 | Margaritis | H04N 7/173 725/116 |
| 2011/0002399 A1* | 1/2011 | Raveendran | H04N 19/172 375/240.28 |
| 2012/0030554 A1* | 2/2012 | Toya | H04N 7/17318 715/206 |
| 2013/0031575 A1* | 1/2013 | Gallant | H04L 41/5038 725/20 |
| 2016/0037176 A1* | 2/2016 | Chari | H04N 21/23439 375/240.26 |
| 2016/0105689 A1* | 4/2016 | Sorlander | H04H 20/02 375/240.27 |
| 2017/0289228 A1* | 10/2017 | Romrell | H04L 65/605 |
| 2018/0124445 A1* | 5/2018 | Beili | G06F 16/182 |

* cited by examiner

LINEAR CHANNEL DISTRIBUTION OF CONTENT IN A TELECOMMUNICATIONS NETWORK

CROSS-REFERENCE TO RELATED APPLICATIONS

This application is related to and claims priority under 35 U.S.C. § 119(e) from U.S. Patent Application No. 62/540,958, filed Aug. 3, 2017, titled "LINEAR CHANNEL DISTRIBUTION OF CONTENT IN A TELECOMMUNICATIONS NETWORK," the entire content of which is incorporated herein by reference for all purposes.

TECHNICAL FIELD

Embodiments of the present invention generally relate to systems and methods for implementing a telecommunications network and more specifically for providing multichannel video programming or content through the telecommunications network.

BACKGROUND

Multichannel video programming generally includes combining multiple content streams received from content providers for transmission. For example, in a satellite television system, a direct broadcast satellite (DBS) provider or similar multichannel video programming distributor may receive and combine multiple content streams from content providers (e.g., televisions stations or broadcast networks) or similar programming sources. This combined signal may then be transmitted to a receiver for distribution and viewing. Referring again to satellite television systems, the DBS provider may transmit the combined content streams to a satellite via an uplink which in turn provides a downlinked satellite signal to a receiving dish. The received signal is then passed to a receiver, such as a set-top box, where it can be further processed. Such processing may include, among other things, decrypting the signal and applying a filter to isolate a particular channel or content stream.

The nature and complexity of conventional multichannel video programming systems present various limitations. For example, such systems are often costly due their significant operational overhead and may have occasional substandard video quality due to the compression required to efficiently transmit the multichannel signal and the latency resulting from transmitting signals between satellites and terrestrial equipment.

It is with these issues in mind, among others, that various aspects of the present disclosure were conceived.

SUMMARY

In one aspect of the present disclosure, a method of transmitting a content stream through a telecommunications network is provided. The method includes receiving the content stream from a content provider device at a network device of the telecommunications network and replicating the content stream using the network device to generate a replicated content stream. The network device receives a request to provide the replicated content stream to a receiver from a controller and transmits the replicated content stream to the receiver.

In certain implementations, the method may further include the network device receiving multiple content streams and transmitting replications of at least a portion of the content streams to the receiver. Similarly, the method may include transmitting the replicated content stream to multiple receivers.

The method may further include receiving a request from the controller to transmit an alternative replicated content stream to the receiver. For example, an alternative replicated content stream may be provided if quality issues are detected in the content stream or the replicated content stream. In other implementations, the alternative replicated content stream may be provided based on customer characteristics. For example, an alternative content stream including a notification may be sent to receivers of customers who are delinquent on bill payment.

In certain implementations, transmission of the replicated content may be controlled, at least in part, by scheduling instructions received by the network device from the controller. Such scheduling instructions may include, among other things, one or more of a transmission start time, a transmission end time, or a transmission duration of a replicated content stream transmission to be sent from the network device to a particular receiver.

The network device may be adapted to preserve metadata contained within the content stream in the replicated content stream. For example, in certain implementations, the content stream may include Society of Cable and Telecommunications Engineers (SCTE)-35 metadata for signaling advertising insertion.

The method may further include routing the replicated content stream over a path through the telecommunications network. For example, the replicated content stream may contain multiple packets, each of which may have a header populated by the network device with a routing label corresponding to the path the packet is to follow.

In another implementation, the content stream may be further replicated to generate a test content stream that is then transmitted to a data analyzer. The data analyzer may then determine one or more quality metrics for the received content stream. Such quality metrics may correspond to, among other things, the image quality of the replicated content stream or the consistency and reliability of the transmission of the replicated content stream. As such, the quality metrics provided by the data analyzer may be used to control one or both of the network device and controller and to inform operators of the telecommunications network about potential issues within the network.

In another aspect of the present disclosure, a system for providing content streams through a telecommunications network is provided. The system includes a network device and a controller communicatively coupled to the network device. The network device is configured to receive a content stream from a content provider device through the telecommunications network and to replicate the content stream to generate a replicated content stream. The network device is further configured to, in response to receiving a request to provide the replicated content stream to a receiver from the controller, transmit the replicated content stream to the receiver.

In yet another aspect of the present disclosure, a method of operating a telecommunications network is provided. The method includes receiving video content streams from content providers at one or more network devices within the telecommunications network. The network devices then replicate at least a portion of the video content streams to generate replicated video content streams. The replicated video content streams are then transmitted to edge devices of the telecommunications network for delivery to respective receiver devices.

DETAILED DESCRIPTION

Figure 1:
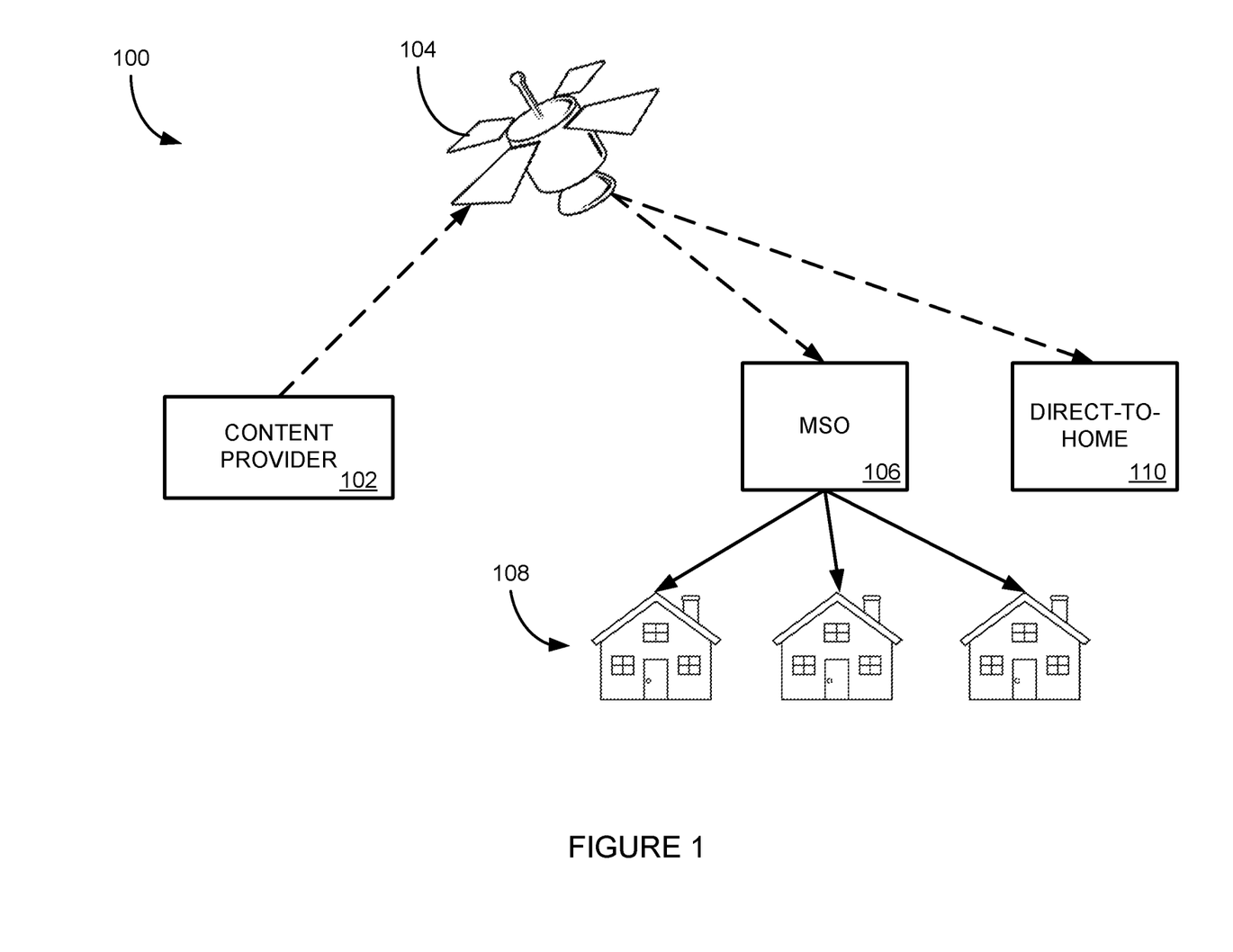
FIG. 1 is a schematic diagram illustrating a content distribution system utilizing a satellite to provide multichannel video program to distributors and providers.

Traditionally, multichannel video programming, such as full-time live television distribution, has been provided through satellite systems that often have substantial latency in providing the content and responding to issues that may occur during broadcast. FIG. 1 is a schematic diagram illustrating a content distribution system 100 utilizing a satellite 104 to provide multichannel video program to distributors and providers. As shown in the system 100, content providers 102 may generate or otherwise produce content that is provided to the satellite 104 on an uplink to the satellite. In some instances, the content from the producers is sent to the uplink station and bundled together for transmission to the satellite 104. Regardless of how the content is produced, the content is typically encrypted at the content provider 102 for transmission on a downlink to one or more receivers of the encrypted content where the content is decrypted for distribution by the receivers.

For example, a content provider 102 may desire to provide produced content to one or more multiple-system operators (MSOs) 106 or distributors of the received content. The content provider 102 will typically lease space or the use of a geostationary satellite 104 to provide the encrypted content to the receiving MSO 106. Further, the content provider 102 provides one or more integrated receiver/decoder (IRD) systems to the receiving MSO 106 for use in decrypting the received signal. Upon decryption, the MSO 106 may bundle and transmit content signals to one or more customers 108 of the MSO (represented in FIG. 1 as homes receiving the decrypted content). In some instances, the content may be re-encrypted by the MSO 106 for transmission to the customers 108 and decrypted again at the customer homes. In another example, one or more direct-to-home 110 systems may receive the encrypted signal from the satellite 104. Similar to the MSOs 106, the direct-to-home systems 110 may also receive an IRD (sometimes referred to as a conditional access system (CAS)) from the content provider to decrypt the received signal from the satellite 104.

However, satellite distribution systems often require significant compression, latency, expense, and operational overhead—with limited scalability. For example, the transmission of the signal to the satellite 104 from the content provider 102 takes significant time when providing live video content. Further, to reduce the latency of the system, compression of the video content often occurs, degrading the quality of the received content at the MSO 106 or direct-to-home 110 receivers. Also, because each signal or portion of the content is transmitted through the satellite 104, any disruption in operation of the satellite may result in the loss of all content streams to the receivers 106,110. Further still, in general all of the receivers 106, 110 receive the same signal or content from the satellite 104 as the satellite cannot select particular receivers to obtain the signal. Thus, each receiver 106, 110 receives the encrypted signal with all of the video content. This provides a potential security risk if a receiving party 106, 110 is able to decrypt the signal without using the IRD or CAS provided by the content producer. It is with these observations in mind, among others, that various aspects of the present disclosure were conceived and developed.

Aspects of the present disclosure involve systems and methods for providing multichannel video programming or content through a terrestrial fiber network of a telecommunications network. In one implementation, a single high-quality content feed may be provided to one or more replicator devices of the telecommunications network over a communication line. The replicator devices of the network may then deliver one or more of the multichannel video content inputs to any number of customers or receivers of the content also connected to the network. In this manner, the entire multichannel video programming stream is transmitted along a terrestrial fiber network, from content producer to content receiver. By maintaining the content distribution through a telecommunications network, the multichannel video programming may be provided at a higher quality (e.g., by relying on less compression since the signal is not transmitted to a satellite), with greater reliability (e.g., by supporting redundant paths through the network to provide the content stream), and with the ability to scale to meet the demands of the receivers, among other benefits.

In addition to one or more replicators, other services and devices may be provided in the network for content providers or receivers of the system. For example, one or more data analytic systems may be included in the network to analyze and monitor the quality of content provided to the receivers. In one embodiment, each replicator (and other components of the network) may provide data concerning the quality of the received video content from the content producers and/or the transmitted video content to the content receivers. In certain implementations, one or more of the replicators may be configured to generate a replicated content stream for purposes of testing. For example, the replicated content stream may be provided to a hardware or virtual network device configured to receive the replicated content stream and to determine one or more quality metrics for the replicated content stream. Such metrics may, for example, correspond to image quality (e.g., pixelation), stream consistency, stream up-time, or other metrics indicative of the quality of the content or transmission of the content. This data may be analyzed continually or periodically to determine a quality of service and appropriate adjustments or remedies may be initiated in response to the analyzed performance data indicating sub-standard quality of the content stream. In addition, one or more controller systems may be provided that includes an access point to content providers or, in some instances, content receivers to adjust or control aspects of the content transmission. Such control may include, but is not limited to, providing access to particular video content stream to particular receivers, setting dates and times when particular video content streams are available to particular receivers, providing alternate content streams or transmission paths during outages or detected degradations of particular video content streams, and the like. Through the network-based multichannel video programming distribution system described herein, multiple advantages and control are realized over a traditional satellite-based video programming distribution system.

Figure 2:
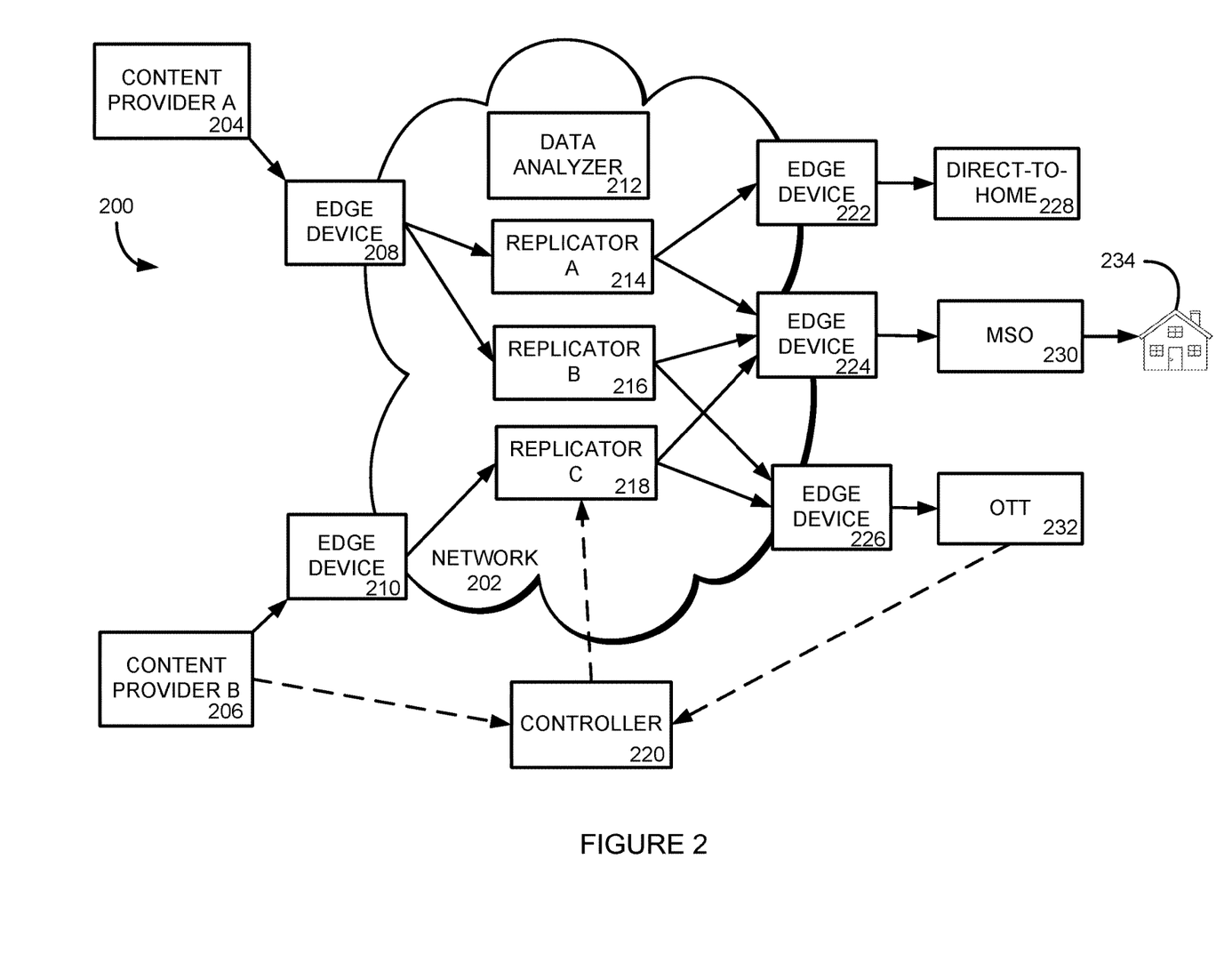
FIG. 2 is a schematic diagram illustrating a content distribution system utilizing a fiber network of a telecommunications network to provide multichannel video program distribution to content providers and receivers.

FIG. 2 is a schematic diagram illustrating a content distribution system 200 utilizing a fiber network 202 of a telecommunications network to provide multichannel video program distribution to content providers and receivers. Several of the components of the system 200 outside of the network 202 are the same or similar as those described above. For example, one or more content providers 204,206 provide encrypted content to a telecommunications network 202 for transmission to one or more receivers 228-232. The receivers 228-232 may also connect to the network 202 to receive the content and may include direct-to-home receivers, such as direct-to-home receiver 228, and multiple-system operators (MSOs), such as MSO 230, which may then provide one or more of the received content streams to customers 232 of the MSO 230. In another example, the system 200 may include an over-the-top (OTT) receiver 232 that generally provides the content to users of the OTT receiver 232 over the Internet. Regardless of the number or types of receivers 228-232, the multichannel video content from the content providers 204,206 may be provided to the receivers 228-232 through a fiber network of the telecommunications network 202, thereby removing the transmission and use of a satellite relay device.

In general, telecommunication networks provide for the transmission of information across some distance through terrestrial communication networks. Such communications may involve voice, data or multimedia information, among others. In one particular embodiment illustrated in FIG. 2, the telecommunications network 202 may provide for establishing communication sessions between content providers 204, 206 of multichannel video programming to content receivers 228-232 such that the receivers 228-232 may receive the content stream produced by the content providers. The network 202 of FIG. 2 may be an Internet Protocol (IP) operating environment, although other networks are contemplated in accordance with the present systems and methods that include high-speed, large-capacity transmission lines, such as fiber optic networks.

The IP network 202 includes numerous components such as, but not limited to gateways, routers, and registrars, which enable communication across the network 202, but are not shown or described in detail here because those skilled in the art will readily understand these components. More relevant to this description is the interaction and communication between the IP network 202 and other entities, such as the one or more content providers 204, 206 and content receivers 228-232. Content providers 204, 206 may include communication devices that transmit a multimedia signal, such as an audio, video or web-based content stream. In one particular embodiment, the content providers 204, 206 transmit an encrypted video stream that includes multiple channels of video content to the network 202.

The content providers 204, 206 typically connect to the IP network 202 via a border network or through a respective edge device 208, 210. The edge devices 208, 210, which may generally be referred to as "ingress" edge devices, provide access to the network 202 such that data packets or content streams may be transmitted into the network 202 for distribution to the receivers 228-232. For example, edge devices 208, 210 may communicate with content providers 204, 206 to establish a communication link between the edge devices 208, 210, and the content providers 204, 206. In one particular example, edge device 208 may broadcast or exchange Border Gateway Protocol (BGP) routing information with content provider 204. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network 202 and/or other network information that pertains to the transmission of content from the network. However, BGP information mainly describes routes used by the network 202 to connect to external networks or device (such as content provider 204, 206) while IGP information describes routes through the network to connect one edge device 208 to another edge device 222 edge through a telecommunications network 202, including routing to other devices (such as replicators 214-218) within the network.

Once in communication with the network 202, the content providers 204,206 may provide encrypted or non-encrypted multichannel video content to the network for distribution to one or more receivers 228-232. In one particular embodiment, the content stream is provided over an Ethernet-type connection with the edge device 208, although any transmission medium may be utilized to transmit the content to the network 202. Because the content stream is provided over a terrestrial transmission line, the content does not require large compression rates as compared to transmitting the content via satellite. Upon receipt, the edge device 208 routes the received content to one or more replicators 214-218 of the network 202 utilizing routing information maintained by the edge device 208 or network 202.

In general, the replicators 214-218 of the network 202 are networking devices that receive multichannel video programming content or other types of IP content and provide replications of the content stream to requesting devices. For example, replicator A 214 may receive a multichannel video stream from content provider 204. Replicator A 214 may then replicate the video stream and provide the stream to one or more receivers, such as direct-to-home receiver 228 and MSO 230 (through network edge devices 222,224 respectively). In general, the receivers 228-232 that receive the content stream have permission or are allowed access to the content stream by the content provider 204. In other words, the receivers 228-232 may contract or agree with the content provider 204 to receive the content stream from the provider. As mentioned above, in some instances the content stream is encrypted. In these instances, the receiver 228-232 may receive a decryption key or device (such as an IRD or CAS) from the content provider 204 in a similar manner as described above. Thus, the encryption of the content stream may be maintained by the replicator 214 during transmission to the receivers. Through the replicators 214-218, a single content stream from a content provider 204 may be provided to any number of receivers 228-232 that have gained access to the content.

The replicator 214 may initiate a first communication session with the content provider 204 to receive the content stream. In addition, the replicator 214 may initiate a second, separate communication session with a receiver 230 to transmit the replicated content to the receiver. In one instance, the replicator 214 may remove one or more headers of the packets of the incoming content stream and insert one or more new headers for transmission to the receiver 230. In this manner, the replicator 214 may control the routing of the content through the network 202 based on information included in the new headers inserted into the content packets. In addition, each replicator 214-218 may receive more than one content stream from one or more content providers 204,206. Thus, although not shown in FIG. 2, replicator A 214 may receive a content video stream from content provider 204 and content provider 206. The different content streams may be received on different input ports to the replicator 214 to keep the content streams separate within the replicator.

In addition, content providers 204,206 may provide a content stream to more than one replicator 214-218 of the network 202. For example, content provider 204 may provide a content stream to replicator A 214 and replicator B 216. Further still, although only illustrated in FIG. 2 as providing a received content stream to two receivers 222, 224, the replicator 214 may provide a received content stream to any number of receivers, with each receiver communicating with the replicator 214 through a particular output port of the replicator device. Generally and discussed in more detail below, the receivers 228-232 connect to and communicate with the network 202 in a similar manner as the content providers 204,206. In other words, the receivers 228-232 establish a communication session with one or more edge devices 222-226 (which may generally be referred to as "egress" edge devices) of the network 202 to begin receiving packets of information transmitted through the network 202. In many cases, the edge device 222-226 utilized by a receiver is the edge device that is the nearest geographically to the receiver, although any edge device may be utilized. Routing of the content stream to the egress edge devices 222-226 may be based at least on internal routing techniques utilized by the network 202 to reach the intended receiver 228-232.

In the example illustrated in FIG. 2, content provider A 204 provides a multichannel video programming content stream to replicator A 214 and replicator B 216. This content stream is then transmitted to direct-to-home receiver 228 and MSO receiver 230 from replicator A 214 and to OTT receiver 232 from replicator B 216. Replicator B 216 also provides the content stream to MSO receiver 230 as a potential backup content stream signal, as explained in more detail below. Content provider 206 provides a content stream to replicator C 218 that is replicated and transmitted to MSO receiver 230 and OTT receiver 232. It should be appreciated, however, that any combination of content providers 204, 206, replicators 214-218, and receivers 228-232 may be configured in the system 200 to provide the multichannel video program content to any number of receivers from any number of content providers. Because the content stream remains within the system 200 from content provider to receiver without utilizing a satellite relay, a higher-quality, more robust distribution of the content to the receivers may occur, several advantages of which are discussed in more detail below.

In addition to the replicators 214-218, additional components or devices may be included in or associated with the network 202 to aid in the use and operability of the content distribution system 200. For example, a data analyzer 212 component of the network 202 may be included in the system 200 to receive performance metrics from one or more other components of the system. For example, replicator A 214 may provide performance data or other data related to the content stream provided to and transmitted from replicator A 214. Such performance data may detect when a content stream goes to black or is otherwise lost, an amount of pixelation in the received content stream, or other measures or video quality in the video stream. This information may be provided to the data analyzer 212 for gathering, correlating to a particular stream or content provider, or other analysis for use by the system 200. In one implementation, the results of the data analyzer 212 may be made available to one or more of the content providers 204,206 to indicate to the provider that the received content is degraded. The data analyzer 212, in some instances, may receive similar information from one or more of the receivers 228-232 of the system 200. With the information received from the system components, such as the replicators 214-218 and/or the receivers 228-232, a network administrator and/or a content provider 204 may identify and rectify performance issues within the content distribution system 200.

In certain implementations, the data analyzer 212 may be in communication with one or more of the replicators 214-218 and may be configured to receive replicated content streams from the replicators 214-218. Such "test" content streams may then be processed by the data analyzer 212 to determine one or more corresponding quality metrics. In other words, the data analyzer 212 may be configured, at least in part, to function as a test receiver that is substantially similar to the receivers 228-232 and, as a result, can be used to test and analyze transmission of data through the network 202. To facilitate such functionality, the data analyzer 212 may include one or both of hardware and software (i.e., virtualized) devices capable of performing such receiving and analysis functions.

In another example, the system 200 may include one or more controller 220 devices. The controller 220 may be included within the network 202 or may be outside the network and in communication with components of the network. In general, the controller provides access to control one or more aspects of the linear system 200 of FIG. 2. For example, a content provider 206 may be granted access to the controller 220 by a network administrator and may interact with the controller through one or more user interfaces. Through the controller 220, the content provider 206 may control the replicators 214-218 of the network 200 to restrict or otherwise select which content streams are transmitted to the receivers 228-232 of the system. For example, content provider 206 may utilize the controller 220 to configure replicator C 218 to provide the content stream to MSO receiver 230 and OTT receiver 232, but restrict access to the content stream for direct-to-home receiver 228. Similarly, one or more of the receivers 228-232 may be provided access to the controller 220 to configure one or more of the replicators 214-218 to tailor the content streams transmitted to the receiver and even the particular port through which the content stream is provided. Access to the controller 220 may be limited to any particular party by a system administrator to prevent abuse of the controller device.

In another embodiment, a system 200 administrator may utilize the controller 220 to configure components of the system based on a request from the content providers 204,206 or the receivers 228-232. For example, the administrator may input a request from the content provider 204 to provide a particular content stream from replicator A 214 to receiver 230. The controller 220 may, in turn, access replicator A 214 and schedule to provide the content stream for the requested time window to receiver 230. Similarly, receiver 232 may request access to a particular content stream from content provider 206 from the administrator of the network 202. Through the controller 220, the administrator (or the controller itself) may verify that receiver 232 has permission to receive the content stream and may schedule for the receiver to begin receiving the content stream.

Figure 3:
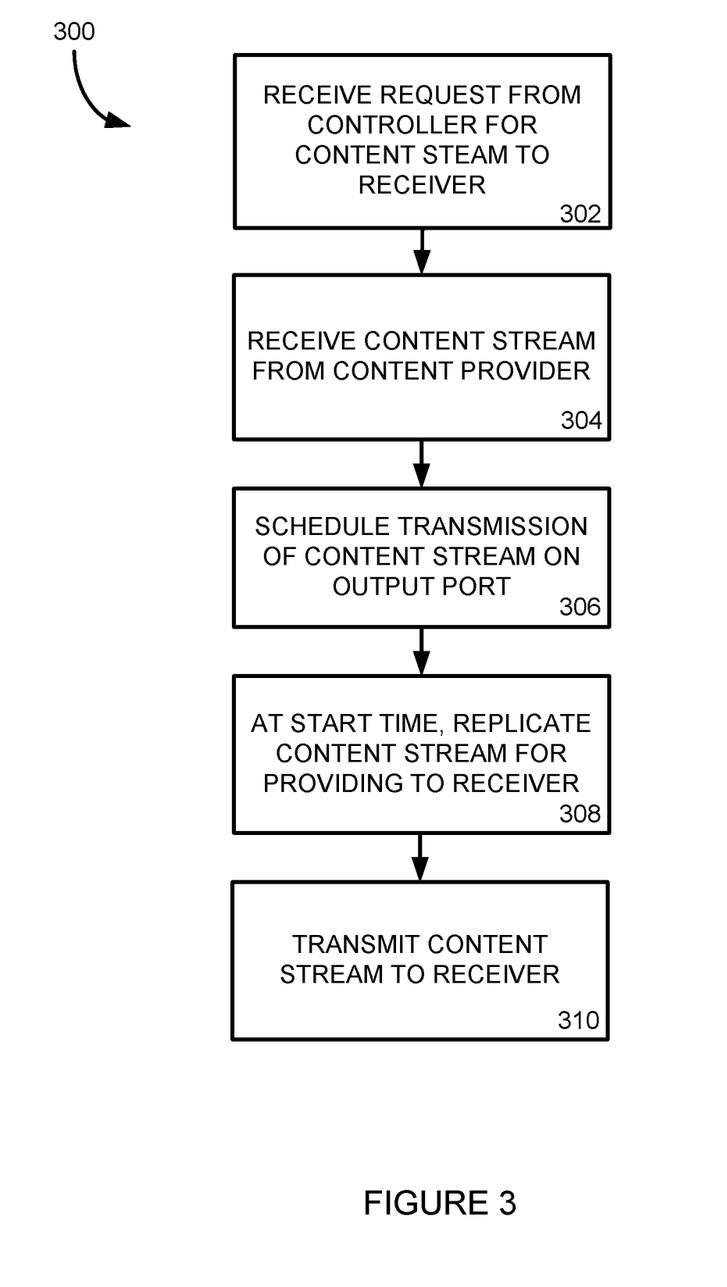
FIG. 3 is a flowchart illustrating a method for scheduling a replicator of the telecommunications network to provide requested multichannel video program content to a requesting receiver.

FIG. 3 is a flowchart illustrating a method for scheduling a replicator of the telecommunications network to provide a requested multichannel video program content to a requesting receiver. In general, the operations of the method 300 of FIG. 3 may be performed by a replicator of the distribution system 200 of FIG. 2. However, one or more of the operations may be performed by any component of the system 200 or the network 202 to aid in providing streamed video content to a receiver of the network.

Beginning in operation 302, the replicator 214 receives a request for providing a content stream to a particular receiver 230 of the system 200 from the controller 220 of the system. In particular, the receiver 230 or a content provider 204 may provide a request or access the controller 220 to request the transmission of a content stream to the particular receiver. If the receiver 230 has permission to access the content stream, the controller 220 may provide a request to the replicator 214 to schedule transmission of the content stream on an output port of the replicator 214 to the receiver 230. In addition, the replicator 214 may receive the video programming content stream from the content provider 204 in operation 304. It should be appreciated that the operations of receiving the request for the content stream and receiving the content stream may occur separately and in any order such that the content stream may be provided to the replicator 214 prior to receiving the request for the content. In such cases, the replicator 214 may terminate the content stream until a scheduled transmission of the content is initiated to a receiver of the system 200.

In operation 306, the replicator 214 may schedule providing the content stream from the content provider 204 on an output port of the replicator. For example, the request may include a start time for providing the content stream to the receiver 230 and the replicator 214 may maintain a schedule of providing content streams to the receivers 228-232 of the system 200. In some instances, the request may also include an end time at which the content stream ceases being transmitted to the receiver 230. The output port of the replicator 214 may be selected by the replicator for providing the content to the receiver 230 or may be selected by another component of the system 200, such as the receiver, the content provider 204, or the controller 220. In one embodiment, the output port may be selected in response to a location (either geographically or logically within the network 200) of the egress edge device 224 associated with the receiver 230.

At the time of the scheduled transmission, the replicator 214 includes one or more routing headers or other information to the content stream for routing through the network 202 to an egress edge device 224 and to the receiver 230 in operation 308. Further, the content stream provided by the replicator 214 may not be the same content stream received from the content provider 204 but may instead be a replicated content stream. In this manner, the replicator 214 may multiply the content stream to transmit to multiple receivers of the system 200. Once the content stream is replicated, the replicator 314 may begin transmitting the content stream on the output port to the receiver 230 in operation 310. Thus, through the operations of the method 300 of FIG. 3, a component of the system 200 may request the transmission of a multichannel video program content to a receiver 228-232 as provided to a replicator 214 of the system.

Several advantages over satellite-based distribution systems may be realized through the terrestrial-based distribution system discussed above. For example and as mentioned above, conventional satellite-based distribution systems lack control over which receivers on the ground receive the transmitted signal from the satellite. Rather, the satellite simply relays the content stream to any device configured to receive the transmitted content. The satellite-based distribution system thus relies solely on encryption to prevent unauthorized receivers from accessing the transmitted content stream. In contrast, the network-based distribution system discussed herein may limit the number of content streams that are transmitted to the receivers of the system and specifically control which of the receivers receive the content streams. In other words, the replicators may be configured to selectively transmit particular content streams to only a subset of the receivers of the system such that not every receiver receives the same transmission of content streams. Accordingly, the distribution system provides flexibility and control as to the type and number of content streams that are published by the content providers and subsequently transmitted to receivers within the system. Among other advantages, such selective content stream distribution prevents a receiver from decrypting a content stream to which the receiver is not subscribed or otherwise lacks authorization, providing greater security to the distribution of content streams.

Further, the linear channel distribution system described herein may facilitate provision of a substitute content stream to particular receivers without affecting the content stream provided to other receivers. For example, in some cases a content provider may want to provide a first content stream to receivers who are current with their bills while providing an alternate content stream to receivers whose bills may be past due. In this situation, the content provider may provide an alternate content stream that includes a notice to the delinquent customer. In another example, some receivers may be precluded from receiving a particular content stream, such as a sporting event that has blackout limitations, while the content stream may be maintained for other receivers outside of the blackout region. In contrast, in a satellite distribution system, every receiver of the system receives the same content stream from the satellite such that changing a content stream for one receiver changes the content for all receivers. Through the distribution system discussed herein, the content provider may simply provide an alternate content stream to a replicator and activate the alternate stream for the particular receiver at a scheduled time. The other receivers of the system, on the other hand, continue to receive the main content stream such that providing the substitute stream to the particular receiver does not affect the content received at the other receivers. In this manner, a content provider may provide a main content stream to some receivers of the system and an alternate or substitute content stream to other receivers of the system. A content provider may include any number of alternate content streams for any number of operational situations of the receivers.

In a similar manner, alternate content streams may be provided in response to data collected at the data analyzer of the system. For example, referring to FIG. 2, the data analyzer 212 may determine that a particular content stream is underperforming (e.g., has high pixelation, has a black screen, etc.) and may instruct the replicators 214-218 (such as through the controller 220) to switch to an alternate content stream from the same content provider 204 or a second content providers 206. For example, feed from the content provider 204 for a major live event may be cut or otherwise experience technical difficulties that are detected by the data analyzer 212. In response, the data analyzer 212 may issue a command to the controller 220 that causes the controller 220 to switch the replicators to 214-218 to an alternate content stream for the same live event. In certain implementations, the rules defining the transition to a back-up content stream may be created and provided by the receivers 228-232 receiving the content, from the content providers 204,206, or from an administrator of the network 202. Notably, because the data analyzer 212 may analyze the content stream on a per stream or per channel basis, the analysis of the content streams may be more detailed than in a satellite-based system because satellite-based systems bundle all content streams into a single transmitted signal that precludes analysis of individual streams contained within the signal. By analyzing the different content streams individually, a back-up content stream may be selected and transmitted to one or more receivers 228-232 when a quality of a particular channel falls below a threshold or standard, without need for manual selection of the different content stream within the system 200.

Another advantage realized through the system described herein is the ability to pass particular types of metadata within the content stream. For example, many satellite-based distribution systems remove certain types of metadata from the content stream, such as Society of Cable and Telecommunications Engineers (SCTE)-35 metadata, which is used to signal local advertising insertion into a content stream. This SCTE-35 metadata may be removed when compressed into a satellite-based signal but may be retained in the content stream of the system described herein, enabling the dynamic insertion of advertisements corresponding to particular geographic locations or viewer demographics. Other metadata of the signal may also be retained that other distribution systems remove for transmission across a system.

Yet another advantage of the systems disclosed herein is that the network 202 may be configured to provide distinct transmission paths for content streams. For example, replicator A 214 may provide a content stream to receiver 228 along a first path through the network 200 while replicator B 216 may provide the same content stream to receiver 230 along a second distinct path through the network. In other words, the two paths may utilize different components of the network 202 to transmit the content stream to the receivers 228, 230. In some instances, the receivers 228, 230 may even be in the same location but receive the content streams along different paths through the network 202. Such transmission flexibility may be used to provide a safe back-up content stream in case one of the paths through the network 202 is compromised or goes down or to balance loading of the network 202, among other things. In another implementation, replicator A 214 may provide a content stream to two or more receivers 228, 230 along two distinct paths by associating a distinct path with an output port of the replicator. In one example, the replicators 214-218 may utilize one or more Multiprotocol Label Switching (MPLS) techniques to route the content streams along distinct paths through the network 202.

Scalability is also realized through the distribution system discussed herein. In particular, satellite-based systems are limited in the ability to efficiently add additional content providers to the transmitted signal as the bandwidth for the satellite transmitted signal is generally limited. In contrast, the system described herein may scale to meet the demands of additional content providers and/or receivers as needed through the inclusion of additional replicators in the network. Further, through one or more networking or routing techniques, the transmission of content through the network may be optimized to facilitate the addition of more receivers to the system. For example, multicast routing techniques may be implemented to connect receivers to a replicator is the geographically near the receiver, thereby reducing the transmission distance for the content. Such multicast techniques may also reduce redundant transmission of the content stream through the network to different receivers as a particular receiver may pull the content stream from an edge device that services two or more receivers. This provides the network with additional bandwidth to support additional receivers to the system. Further, one or more of the components of the network may combine content streams as needed in the network to further improve the transmission of the content streams through the network.

Through the distribution system and methods described herein, a single high-quality content feed may be provided to one or more replicator devices of the telecommunications network over a communication line. The replicator devices of the network may then deliver one or more of the video content inputs to any number of customers or receivers of the content also connected to the network. In this manner, the entire video programming stream is transmitted along a terrestrial fiber network, from content producer to content receiver. By maintaining the content distribution through a telecommunications network, the video programming may be provided at a higher quality (e.g., with less compression), with greater reliability (e.g., through redundant paths), and with improved scalability as compared to conventional satellite-based distribution systems.

Figure 4:
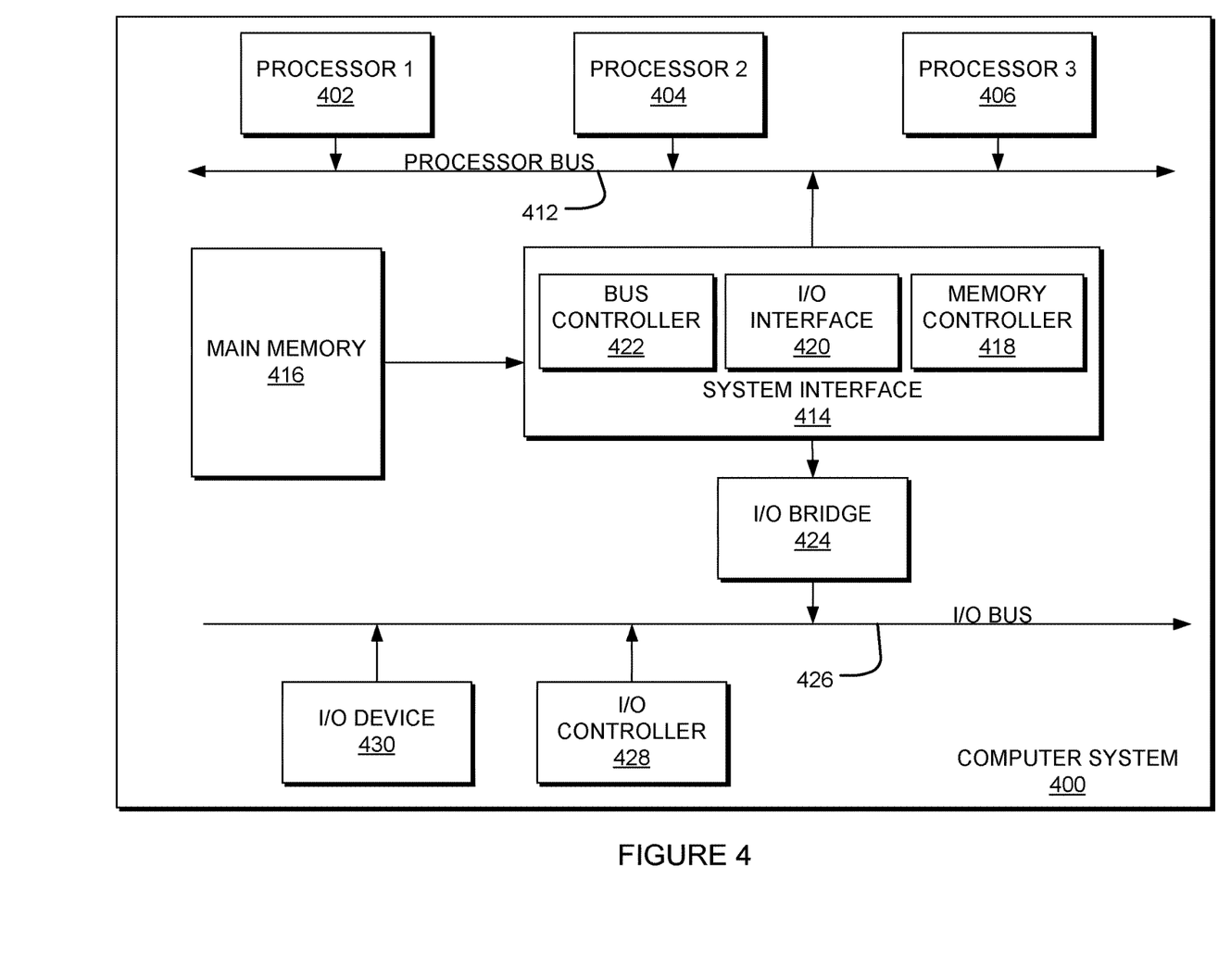
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the system disclosed above. For example, the computing system 400 of FIG. 4 may be any of the controller 220, one of the replicators 214-218, or the data analyzer 212 of the system 200 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated. The system interface 414 may further include a bus controller 422 to interact with processor bus 412 and/or I/O bus 426.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method of transmitting content streams, the method comprising:
   receiving a content stream from a content provider device at a network device of a telecommunications network;
   replicating the content stream using the network device to generate a replicated content stream;
   transmitting, from the network device, the replicated content stream to a data analyzer device, wherein the data analyzer device is configured to test and analyze the replicated content stream through the network;
   transmitting, by the data analyzer device the testing results to the content provider device;
   receiving, at the network device from a controller communicatively coupled to the network device, a request to provide the replicated content stream to a first receiver of a plurality of receivers connected to the network device and to restrict access by a second receiver of the plurality of receivers to the replicated content stream;
   analyzing, by the data analyzer device, one or more content streams individually on a per channel basis;
   determining a channel quality associated with a first content stream of a first channel is below a threshold;
   based on the channel quality associated with a first content stream being below a threshold, transmitting a backup content stream to a third receiver of the plurality of receivers;
   restricting, at the network device responsive to receiving the request, access by the second receiver of the plurality of receivers to the replicated content stream;
   inputting, by an administrator of the controller, a request from the content provider device to stream the replicated content stream to the first receiver during a time window; and
   transmitting, from the network device responsive to receiving the request, the replicated content stream to the first receiver during the time window.

2. The method of claim 1, wherein the replicated content stream is one of a plurality of replicated content streams generated by the network device and the network device transmits only a subset of the plurality of replicated content streams to the first receiver.

3. The method of claim 1 further comprising:
   replicating the content stream using the network device to generate a second replicated content stream;
   receiving, at the network device from the controller, a second request to provide the second replicated content stream to a third receiver; and
   transmitting, from the network device, the second replicated content stream to the third receiver.

4. The method of claim 1 further comprising:
receiving, at the network device from the controller, a request to transmit an alternative replicated content stream to the first receiver instead of the replicated content stream; and
transmitting, from the network device, the alternative replicated content stream to the first receiver.

5. The method of claim 1 further comprising receiving, at the network device from the controller, a scheduling instruction associated with the time window, the scheduling instruction including at least one of a transmission start time, a transmission end time, and a transmission duration, wherein the replicated content stream is transmitted to the first receiver in accordance with the scheduling instruction.

6. The method of claim 1, wherein the replicated content stream retains metadata contained in the content stream received from the content provider.

7. The method of claim 6, wherein the metadata includes Society of Cable and Telecommunications Engineers (SCTE)-35 metadata.

8. The method of claim 1, wherein transmitting the replicated content stream to the first receiver comprises transmitting the replicated content stream over a path through the telecommunications network.

9. The method of claim 8, wherein the replicated content stream comprises a plurality of packets and transmitting the replicated content stream over the path comprises inserting a routing label corresponding to the path into respective headers of each of the plurality of packets.

10. A system for providing content streams comprising:
a network device; and
a controller communicatively coupled to the network device,
wherein the network device is configured to:
receive a content stream from a content provider device through a telecommunications network;
replicate the content stream to generate a replicated content stream;
transmit the replicated content stream to a data analyzer device, wherein the data analyzer device is configured to test and analyze the replicated content stream through the network;
transmit by the data analyzer device the testing results to the content provider device;
input, by an administrator of the controller, a request from the content provider device to provide the replicated content stream to a first receiver of a plurality of receivers connected to the network device during a time window;
in response to receiving the request from the controller to provide the replicated content stream to the first receiver of the plurality of receivers connected to the network device and to restrict access by a second receiver of the plurality of receivers to the replicated content stream, restrict access by the second receiver of the plurality of receivers to the replicated content stream, and transmit the replicated content stream to the first receiver during the time window;
analyze, by the data analyzer device, one or more content streams individually on a per channel basis;
determine a channel quality associated with a first content stream of a first channel is below a threshold; and
based on the channel quality associated with a first content stream being below a threshold, transmit a backup content stream to a third receiver of the plurality of receivers.

11. The system of claim 10, wherein the network device is further configured to generate a plurality of replicated content streams including the replicated content stream and to transmit each of the plurality of replicated content streams to a respective receiver.

12. The system of claim 10, wherein the network device is further configured to receive a scheduling command associated with time window, the scheduling command including at least one of a transmission start time, a transmission end time, and a transmission duration, and to transmit the replicated content stream in accordance with the scheduling command.

13. The system of claim 10, wherein the network device is further configured to:
generate an alternative replicated content stream; and
transmit an alternative replicated content stream to the first receiver instead of the replicated content stream.

14. The system of claim 10, wherein the network device is configured to generate an alternative replicated content stream from an alternative content stream received from the content provider.

15. The system of claim 10, wherein the replicated content stream comprises a plurality of packets and the network device is further configured to route the plurality of packets over a network path by inserting a routing label corresponding to the path into respective headers of each of the plurality of packets.

16. The system of claim 10, wherein the controller is further configured to transmit a control signal to the content provider device to cause the content provider device to transmit the content stream to the network device.

17. The system of claim 10 wherein the network device is further configured to preserve metadata of the content stream in the replicated content stream.

18. A method of operating distributing content streams, the method comprising:
receiving video content streams from a plurality of content providers at one or more network devices within a telecommunications network;
replicating, at the one or more network devices, at least a portion of the video content streams to generate replicated video content streams;
transmitting, from the one or more network devices, the replicated video content streams to a data analyzer device, wherein the data analyzer device is configured to test and analyze the replicated video content streams through the network;
transmitting, by the data analyzer device the testing results to a content provider device;
restricting, at the one or more network devices, access to the replicated video content streams by a second receiver device of a plurality of receivers connected to an edge device of the telecommunications network;
analyzing, by the data analyzer device, one or more content streams individually on a per channel basis;
determining a channel quality associated with a first content stream of a first channel is below a threshold;
based on the channel quality associated with a first content stream being below a threshold, transmitting a backup content stream to a third receiver of the plurality of receivers;
inputting, by an administrator of a controller, a request from the content provider device to stream the replicated video content streams to a first receiver device during a time window; and
transmitting, from the one or more network devices, the replicated video content streams to the edge device of the telecommunications network for delivery to the first receiver device of the plurality of receivers during the time window.

19. The method of claim 1, further comprising verifying by the controller that the first receiver has permission to receive the replicated content stream before transmitting the replicated content stream to the first receiver.

\* \* \* \* \*